Oct. 7, 1958 H. G. SPIER 2,854,963
FREE PISTON ENGINES
Filed May 27, 1957 2 Sheets-Sheet 1
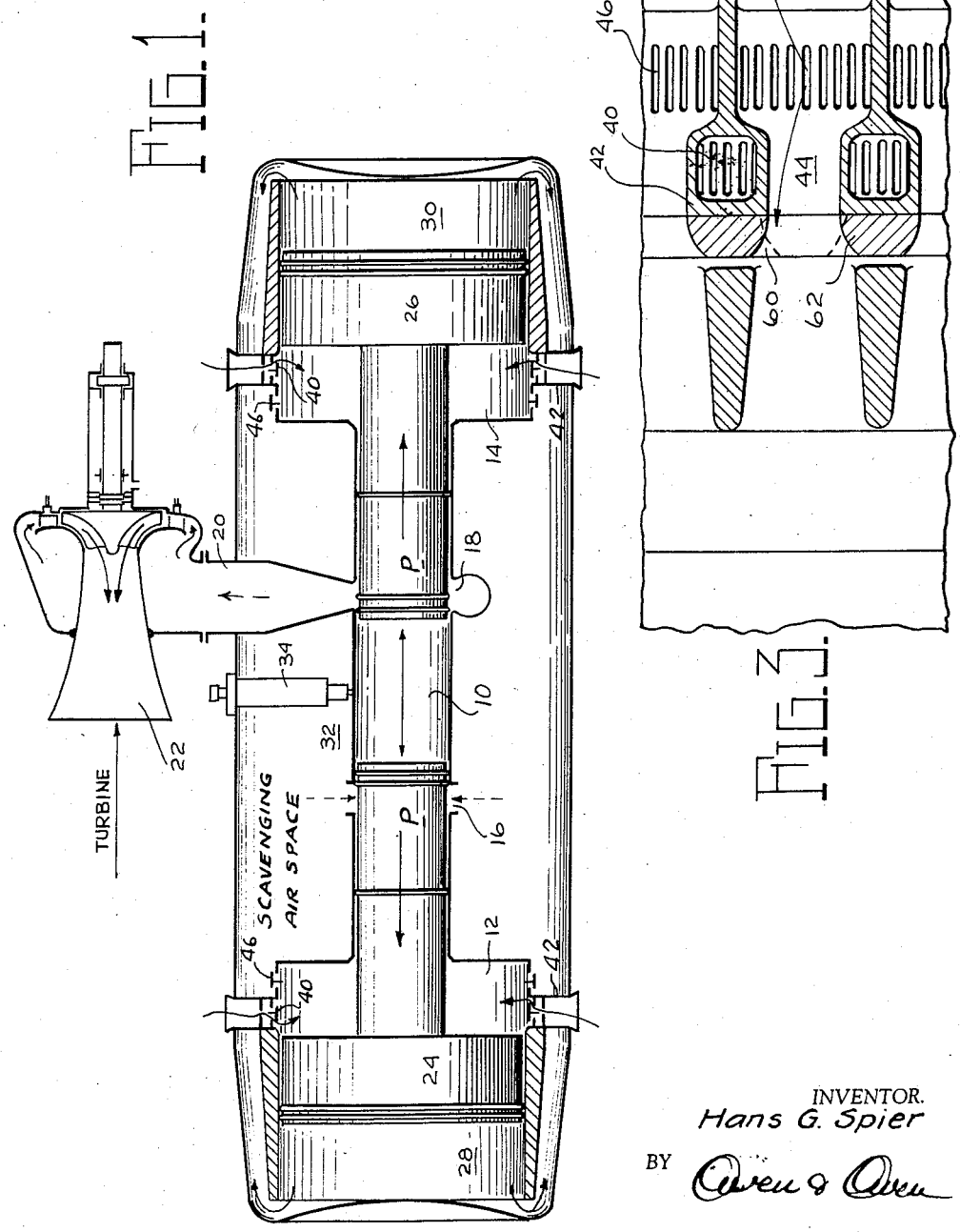
INVENTOR.
Hans G. Spier
BY
ATTORNEYS Oct. 7, 1958 H. G. SPIER 2,854,963
FREE PISTON ENGINES
Filed May 27, 1957 2 Sheets-Sheet 2
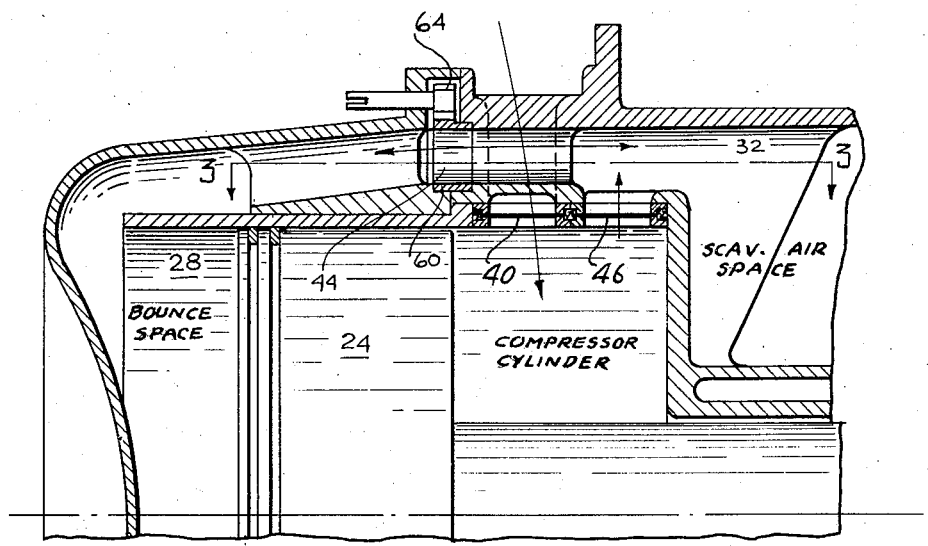
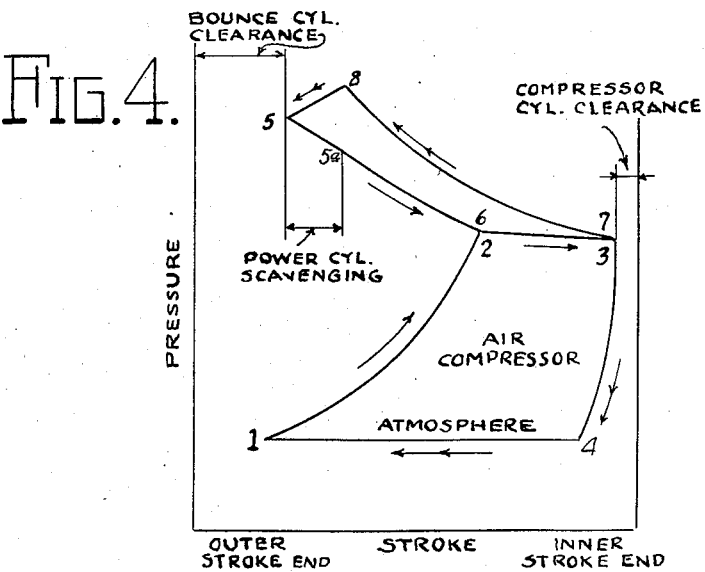
INVENTOR.
Hans G. Spier
BY
Owen & Owen
ATTORNEYS

United States Patent Office 2,854,963
Patented Oct. 7, 1958

2,854,963
FREE PISTON ENGINES

Hans G. Spier, Hamilton, Ohio, assignor to Baldwin-Lima-Hamilton Corporation, Hamilton, Ohio, a corporation of Pennsylvania Application May 27, 1957, Serial No. 661,657

2 Claims. (Cl. 123—46)

This invention relates to free piston power gas generators operating on a two-stroke diesel cycle, and is particularly directed to a means to improve the operating characteristics of such an engine.

Free piston engines generally comprise facing power and compressor cylinders in which a combination of power and compressor pistons reciprocate with a substantially free stroke length which can vary during the operation of the engine. There is a balance of forces occurring on the pistons in each direction so that continuous operation is obtained for the purpose of producing power gas for direct industrial use or usually for conversion into mechanical power by a turbine or similar consumer.

In the usual free piston engine, the pistons are arranged so that the force of the power stroke is opposed by a "bounce" force derived from a closed air filled space in which the air is compressed by the motion of the piston during its power stroke and energy is stored therein. This energy is released during the return stroke of the pistons on the compression stroke.

In addition, in the usual engine, the work of the fuel combustion in the power cylinder is absorbed partially as the work of compression in compressing air in a separate compressor cylinder. The compression and release of the air in the compressor cylinders adds its energy characteristics to the general force balance of the engine and is related to the pressure, temperature and flow of the power gas delivered by the engine to the consumer.

The forces set up in the bounce cylinders in power gas generators must be carefully adjusted to the power gas output conditions, in order to retain the perfect force balance required for continuous operation of the power gas generators under normal stroking conditions. This regulation of the bounce forces is usually accomplished by automatic devices which add to or extract air from the closed bounce spaces as required. Because of the relatively large air volumes in the bounce spaces regulation by automatic devices is necessarily prolonged over a measurable time period usually occupying a number of piston strokes so that any change in power gas output must occur slowly enough that the pistons do not overstroke or understroke more than a predetermined amount during the time required to adjust the bounce forces.

Many uses of power gas particularly in turbines, however, requires that changes in the output be made very rapidly in order that the free piston power gas generator and its driven turbine may be a practical power source. Particularly when radial inflow turbines are used for conversion of the power gas to power in a rotating shaft a practical application requires that very rapid changes of load must be made. The flow capacity of such turbines varies greatly with speed and in the case of a turbine which is to be reversible by a change in guide vane position an additional variable is introduced due to the unavoidable change in guide vane flow area during the reversing operation. Radial inflow turbines are economically advantageous over other types, because of their low cost and their reversibility and also because their guide vanes can be moved into a "neutral" position for completely stopping rotation of the turbine without the necessity of bypassing or shutting off the flow of gas thereto. The flow-change characteristic of radial inflow turbines is therefore an important factor in the consideration of the type of free piston power gas generator to be used and its inherent responsiveness to the force-balance control.

The primary object of the present invention is to provide a free piston power gas generator that is particularly suited for supplying gas to a radial inflow turbine and which eliminates the need for any distinct control device for the bounce cylinders and permits immediate balance of the generator under any practical flow of power gas within the limits required by the associated radial inflow turbine.

Another object of the invention is to provide a power gas generator in which the exhaust pressure may be increased by increasing the volumetric efficiency of the compressor cylinder and utilizing the bounce space as a secondary compression stage.

Other objects and advantages of the invention will become apparent from the following specification, reference being had to the accompanying drawings, in which—

Fig. 1 is a diagrammatic view showing a central longitudinal section of a free piston power gas generator incorporating the present invention;

Fig. 2 is a fragmentary enlargement showing the end of the engine and the air passages therein;

Fig. 3 is a section on line 3—3 of Fig. 2; and

Fig. 4 is a diagram showing the variation of pressure in the compressor and bounce cylinders plotted against the stroke of the compressor piston.

Referring to the drawings, and particularly to Fig. 1, the engine comprises a central power cylinder 10 with compressor cylinders 12 and 14 on each side thereof. The power cylinder is provided with a circumferential series of scavenging ports 16 and a spaced circumferential series of exhaust ports 18 leading to an exhaust header 20 from which power gas may be taken to a turbine designated generally 22. The compressor cylinders 12 and 14 house compressor pistons 24 and 26, the rear face of which is used to form the front wall of a bounce space on each side of the engine, the bounce spaces being designated 28 and 30. While in most free piston engines the bounce spaces are closed, in the present invention the bounce spaces communicate with the scavenging air space as hereinafter described. In the drawings, the scavenging air space is designated as such by a legend and by the reference numeral 32.

The power cylinder 10 may be supplied with fuel from a conventional injector 34 and either gas or oil may be utilized as a fuel. No specific disclosure of the fuel system of the engine has been made in the drawings since any conventional system may be used. Similarly, the usual synchronizing racks that connect the pistons 24 and 26 have been omitted in the interest of clarity.

Air is supplied to the compressor cylinders through a series of inlet valves diagrammatically shown in Fig. 1. These valves are of the reed type and are disposed at the lower side of intake passages 40 indicated in Figs. 2 and 3. As shown in Fig. 3 the intake valve sets are spaced from each other in separate bosses or passage forming walls designated 42. The space between the walls is open, as shown in Fig. 2, both to the bounce spaces 28 and 30 and to the scavenging air space 32. These passages are designated 44 and communicate directly with reed type discharge valves 46 disposed in a circumferential series around the compressor cylinder so that compressed air is forced from the cylinder as the compressor piston approaches the inner end of its stroke.

It will thus be seen that the bounce spaces 28 and 30 are always in communication with the scavenging air space 32 but that during the outward stroke of the compressor pistons 24 and 26 the bounce air space is reduced in volume, resulting in a rise in the bounce pressure as well as a rise in the scavenging air pressure until such time as the scavenging ports 16 in the power cylinder 10 are exposed and air flows through the power cylinder into the exhaust duct through the now open passages 18.

After the scavenging flow through the power cylinder is completed, the remaining bounce and scavenging air pressures remain substantially at the same level as the discharge pressure of the engine which is sufficient to reverse the pistons and cause them to make the designed and contemplated inward stroke. The energy required for the inward stroke may be readily calculated and may be derived from the force exerted on the rear faces of the compressor pistons 24 and 26 by the air pressure in the bounce spaces.

During the inward stroke of the pistons the air which has been taken into the compressor cylinder on the previous outward stroke through the intake passages 40 is compressed and is discharged through valves 46 into the axial passages 44 and thus both into the scavenging air space and into the bounce spaces. During this inward stroke the volume of the bounce spaces 28 and 30 has expanded and the pressure in the bounce spaces and the scavenging air space 32 is correspondingly reduced. This rate of pressure reduction is reduced, however, as soon as the compressor cylinder begins to discharge its contents through the discharge valves 46 into the axial passages 44 near the end of the inward stroke of the compressor pistons 24 and 26.

As the pistons near the inner end of their stroke the power pistons, designated P in Fig. 1, approach each other and fuel is injected into the power cylinder 10 and the force of the combustion therein reverses the motion of the pistons to make an outward stroke and the cycle repeats itself.

It is evident that with properly proportioned spaces and volumes, an energy balance can be obtained which will operate the power gas generator over successive strokes. The cycle of operation of the present invention, characterized by opening the bounce spaces to the scavenging air receiver results in an operation that is, in effect, a two-stage compression of the air used for scavenging. It will be apparent that the compressor pistons operate to compress a charge of fresh air from atmospheric pressure to an intermediate pressure during the forward stroke and that this air is further compressed on the return stroke by the rear face of the compressor pistons acting in the bounce spaces. The air is discharged at the intermediate pressure into the scavenging receiver and is drawn into the bounce spaces during the forward stroke of the piston and expelled therefrom at a higher pressure during the return stroke. The two stages of compression can be followed best by the stroke-pressure diagram shown in Fig. 4.

As indicated in Fig. 4, the compressor cylinder is at a pressure such that the intake valves open at point 4 and the cylinder is filled during the outer stroke at substantially atmospheric pressure. The outer limit of the stroke is indicated at point 1. During the inward stroke air is compressed from point 1 to point 2 at which time the discharge valves 46 open and air flows from the compressor cylinder into the scavenging receiver between points 2 and 3 on the diagram. When the compressor piston reaches the inner end of its stroke the discharge valves close and the pressure in the compressor cylinder drops rapidly as the piston starts the next outer stroke so that the pressure falls from the value at point 3 to the atmospheric pressure value of point 4.

The pressure diagram of the intercommunicating bounce chambers and scavenging air receiver may be followed from the same figure of the drawings. As indicated, during the outward stroke of the pistons the air pressure rises from a value designated by point 7 which is the same as the ultimate discharge value of the air compressor to a value corresponding to that shown at point 8 due to the compression that takes place in the bounce space because this space is made smaller as the compressor pistons move outwardly. When the scavenging air ports 16 open there is a perceptible drop in the pressure in the scavenging air space even though the bounce pistons are still moving outwardly because the air flows from the scavenging air space through the power cylinder to the exhaust ports 18. Thus the pressure drops from a value corresponding to point 8 in Fig. 4 to a value corresponding to point 5a, a portion of the drop taking place on the outward stroke of the pistons and the remainder of the drop taking place during the next succeeding portion of the inward stroke until the scavenging air ports 16 are again covered by the power piston P. The pistons are now moving inwardly so that the bounce space is being enlarged and the pressure thus drops from a point corresponding to point 5a to the pressure corresponding to point 6 at which time the discharge valves of the air compressor open. The value of the pressure in the scavenging air receiver and the discharge pressure of the compressor cylinder thus correspond and the two curves coincide from point 6 to point 7 on the diagram.

It will be seen that if the load on the engine changes, resulting in a change in the exhaust pressure, that an immediate correction is made in the bounce pressure. Thus a change in exhaust pressure causes a greater or less flow of air through the cylinder at the next stroke of the pistons when scavenging ports 16 and exhaust ports 18 are both opened so that the pressure change is reflected in the pressure in the scavenging air space 32. This space being in communication with the bounce cylinders by passages 44, the pressure in these latter cylinders likewise changes immediately. Where in most free piston engines the bounce pressure is regulated by a governor mechanism and operates only over several piston strokes, the present invention makes it possible for the pressure adjustment to be made instantaneously and without the necessity of a separate governor. This rapid response to changes in load (changes in exhaust pressure) makes feasible the use of a radial inflow turbine with its adjustable guide vanes as a prime mover.

It will also be seen from the diagram that the air used for scavenging is compressed initially in the compressor cylinder and subsequently in the bounce spaces. The two-stage compression thus obtained greatly increases the efficiency of the machine as a whole, because of the known fact that the volumetric efficiency of a reciprocating compressor increases with decreasing pressure ratio, or the decreased remaining weight of air at the end of the piston discharge stroke, point 3 in Fig. 4, requires less piston return stroke to point 4, Fig. 4, to equal the atmospheric pressure on the intake reed valves, and a longer intake stroke is thus effected with consequent intake of a greater amount of air for the same piston stroke. Since only about half of the work of compressing the scavenging air is done in the cylinders 12 and 14 the temperature of the air passing through the discharge valves 46 is greatly less than in those machines in which all of the work of compression is done in these cylinders and the bounce spaces used only as energy accumulators. The lower valve operating temperatures and stresses not only increase the life of the valves but a great reduction in carbon deposits caused by oxidation of lubricating oil will be found on the surfaces of the discharge valves 46 and their associated cages.

Starting of the machine may be accomplished in any suitable manner. However, since most starting systems require that the bounce spaces be closed to receive a charge of starting air, provision is made for accomplishing this end in the machine of the present invention. As best shown in Figs. 2 and 3 a circumferentially movable ring 60 is provided which has spaced radially solid portions 62 which cooperate with the walls 42 that form the intake passages 40 to form, in turn, the communicating passages 44 which join the bounce cylinders with the scavenging air space 32. The ring is so formed that when it is rotated to the position shown in Figure 3 the passages 44 are open and unobstructed, but when the ring 60 is rotated slightly the portions 62 can be made to overlap the surfaces of adjacent intake passage bosses as indicated in dotted lines in Fig. 3 for the purpose of closing off the passages 44. Thus the bounce cylinders are separated from the scavenging air space 32. The mechanism for imparting this slight rotation to the ring 60 may be seen in Fig. 2 and comprises a pinion 64 meshing with a segment of a ring gear formed on the exterior of the ring 60. When the engine is to be started, the operator rotates the pinion 64 and thus ring 60 to close off the bounce cylinders after which air may be then introduced by any of the many known starting devices to impart the proper initial stroke to the engine pistons.

While the invention has been disclosed in conjunction with a specific form and disposition of the parts, numerous modifications and changes may be made therein without departing from the spirit and scope of the appended claims.

What I claim is:

1. In a free piston power gas generator comprising a central power cylinder, compressor and bounce cylinders at each end of said power cylinder, and pistons in the respective cylinders, the improvement comprising a scavenging air space into which air is discharged from said compressor cylinders, and a plurality of passages between said scavenging air space and said bounce cylinders whereby said space and said cylinders are in substantially open communication with each other during normal running of the engine.

2. The improvement defined in claim 1, and means to close off said plurality of passages to isolate said bounce cylinders during starting.

References Cited in the file of this patent

UNITED STATES PATENTS

| | | |
|---|---|---|
| 2,452,194 | Huber | Oct. 26, 1948 |
| 2,462,745 | Horgen | Feb. 22, 1949 |
| 2,695,601 | Huber | Nov. 30, 1954 |

FOREIGN PATENTS

| | | |
|---|---|---|
| 556,454 | Great Britain | Oct. 6, 1943 |